United States Patent [19]

Russo et al.

[11] Patent Number: 5,663,253

[45] Date of Patent: Sep. 2, 1997

[54] POLICARBOXYLIC ACIDS

[75] Inventors: Matteo Zanotti Russo; Ferruccio Berté, both of Bergamo, Italy

[73] Assignee: 3V Inc., Weehawken, N.J.

[21] Appl. No.: 667,091

[22] Filed: Jun. 20, 1996

[51] Int. Cl.⁶ .................................................. C08F 2/00
[52] U.S. Cl. .................................................. 526/216
[58] Field of Search .................................... 526/216

[56] References Cited

U.S. PATENT DOCUMENTS

| | | | |
|---|---|---|---|
| 2,824,124 | 2/1958 | Robertson et al. | 526/216 |
| 4,267,103 | 5/1981 | Cohen | 526/216 |
| 4,683,274 | 7/1987 | Nakamura et al. | 526/216 |
| 4,758,641 | 7/1988 | Hsu | 526/216 |
| 5,342,911 | 8/1994 | Bresciani | 526/216 |

*Primary Examiner*—Joseph L. Schofer
*Assistant Examiner*—N. Sarofim
*Attorney, Agent, or Firm*—Griffin, Butler, Whisenhunt & Kurtossy

[57] ABSTRACT

The present invention relates to a process for the preparation of crosslinked polymers and copolymers of acrylic acid and methacrylic acid of formula

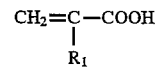

wherein $R_1$ is hydrogen or methyl. Said process, using ethyl formate as solvent, allows to obtain polymers having low residue of monomer and of solvent and with higher thickening capacity.

18 Claims, No Drawings

POLICARBOXYLIC ACIDS

The present invention relates to polymers and copolymers of unsaturated carboxylic acids, in particular polymers and copolymers of acrylic acid and methacrylic acid and their derivatives.

BACKGROUND OF THE INVENTION

Homopolymers and copolymers of unsaturated carboxylic acids, such as acrylic acid, methacrylic acid, itaconic acid, maleic acid with other vinylidene monomers, are well known, as described in patent U.S. Pat. No. 2,798,053 and in subsequent patents on the same matter.

For example, subsequent patents U.S. Pat. No. 4,375,533, U.S. Pat. Nos. 4,419,502 and 4,996,274 disclose polymerizations carried out in different solvent systems, such as aromatic, hydrocarburic, halogenated, wherein said unsaturated acids polymerize by precipitation in the form of fine powders, which are subsequently dried, in order to be used as thickening and suspending agents in different industrial fields.

The solvents and monomers used in said patents however are toxic, and residue quantities in the obtained products hinder their use in the cosmetic and pharmaceutical field.

The possibility of using each of the solvents having a hydrogen bond number between 0.7 and 1.7 and solubility parameters between 8 and 15 is claimed in U.S. Pat. No. 4,267,103, in particular ethyl acetate is suggested when more than 3% by weight of monomer acids in the monomer mixture is in neutral form.

U.S. Pat. No. 4,758,641 claims the use of acetone and alkyl acetates, already cited in U.S. Pat. No. 4,267,103, used for the polymerization, but with a water content limited to 1% by weight to reduce the content of monomer residue under 0.2% in order to lower the toxicity of the finished product. Said solvents have a low grade of toxicity: nevertheless they are difficult to remove from the finished product which generally contains about 0.8% by weight of them, unless it is treated with prolonged drying systems at high temperature, whereby the polymer is degraded causing the formation of unwanted by-products.

Relying on the state of the art, then it is impossible to produce a polymer such as polyacrylic acid with a residue monomer content lower than 0.2% by weight and with a low-toxicity solvent residue whose content is below 0.8% by weight.

SUMMARY OF THE INVENTION

Surprisingly, it has been found that when ethyl formate is used as the solvent for the polymerization of the above monomers, wherein the mixture of monomer acids is neutralized even with less than 3% by weight or is not neutralized at all, the monomer residue in the finished product is even lower than 0.1% by weight, and the solvent residue is even lower than 0.15% by weight.

Moreover, the so obtained polymer shows a thickening capacity higher than the one obtained according to U.S. Pat. No. 4,758,641 and U.S. Pat. No. 4,267,103, at the same conditions.

Therefore, it is an object of the present invention to provide a process for the preparation of polymers and copolymers of acrylic acid and methacrylic acid and their derivatives characterized in that the polymerization is carried out in ethyl formate at a temperature ranging from 40° to 80° C., wherein the monomer mixture is up to 30% by weight of the whole polymerization mixture. It is another object of the present invention to provide a homopolymer or a copolymer both as such and as obtainable by the process according to the present invention, characterized in that they have a monomer residue content lower than 0.1% by weight and a solvent residue content lower than 0.15% by weight.

It is another object of the present invention to provide a method for thickening an aqueous composition which comprises the addition of a suitable amount of a polymer or copolymer of the present invention.

DESCRIPTION OF PREFERRED EMBODIMENTS

The homopolymers and copolymers according to the present invention are obtained by polymerizing unsaturated carboxylic acids and/or their salts containing at least a double activated olefinic bond, polycarboxylic acids and their anhydrides.

The monomeric mixture is polymerized by precipitation from ethyl formate, thereby, after a vacuum drying, a polymer product in the form of powder is obtained.

Ethyl formate is a solvent having low toxicity and naturally occuring in food substances: it is admitted for the use in food as a flavouring agent, and it is included in the "GRAS" list of the substances generally known as safe. Moreover it has an oral $LD_{50}$ of 4290 mg/kg in the rat (Snyder, R (Ed.), Ethel Browning's Toxicity and Metabolism of Industrial Solvents. Second Edition vol. 3, Alcohols and Ethers. NY: Elsevier, 1992, 312) allows its classification among not noxious substances.

The monomeric mixture, other than main monomers, can include crosslinking agents. The main monomers are at least 95% by weight of the monomeric mixture, crosslinking agents are not more than 5% by weight of the monomeric mixture.

According to the present invention suitable monomers are monounsaturated acrylic acids having the following formula:

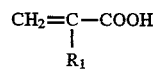

wherein
$R_1$ is hydrogen or methyl.

The monomer mixture can contain up to 5% by weight of crosslinking monomers containing at least two $CH_2=CH-$ groups selected from the group of the polyalkenyl polyethers having more than one alkenyl group per molecule.

Typical crosslinking monomers are: polyallyl pentaerythritol, polyallyl saccharose, trimethylol-propane diallyl ether, diallyl ethers of polyether diols having molecular weight between 50 and 1,000.

The polymerization solvent of this invention is ethyl formate; the amount of solvent must be such as the monomeric mixture is not more than 30% by weight of the whole polymerization mixture.

The polymerization in ethyl formate takes place generally in the presence of a radicalic initiator, in a closed reactor with inert atmosphere and with autogenous or artificially induced pressure, or in a open reactor at atmospheric pressure with solvent reflux.

The polymerization temperature is between 40° and 80° C., preferably between 40° and 60° C.

Suitable radicalic initiators are, for example, di(2-ethythexyl)peroxydicarbonate, di(sec-butyl)-peroxydicarbonate, di(cyclohexyl)peroxydicarbonate, di-(isopropyl)peroxydicarbonate, di(cetyl)peroxydicarbonate, di(t-butyl)peroxydicarbonate, di(n-propyl)peroxydicarbonate, di(t-butylcyclohexyl)peroxydicarbonate and the other similar peroxydicarbonates.

In order to have a more fluid polymeric mixture, part of the carboxylic groups of the used monomers can be neutralized before starting the polymerization or during the polymerization process, or salts of the carboxylic acids in the monomeric mixture can be used, such that less than 3% by weight of the carboxylic groups of the monomeric mixture is in the form of alkali or alkaline-earth metal salts, ammonium or alkylammonium salts.

The following examples further illustrate the invention, according to which the use of ethyl formate as the solvent system instead of a typical solvent among those mentioned in U.S. Pat. No. 4,758,641, such as ethyl acetate, yields polymeric powders containing lower solvent residue and having a higher viscosity of a 0.5% by weight aqueous solution neutralized with 10% NaOH solution, showing better thickening properties.

EXAMPLES 1–4

These comparison tests reproduce the conditions of the state of the art compared with what claimed in the present invention; Examples 1 and 2 are comparison examples representative of the solvents and of the operative conditions claimed in U.S. Pat. No. 4,758,641 and the solvent used is ethyl acetate, whereas Examples 3 and 4 are representative of the present invention and the solvent used is ethyl formate.

In the examples, acrylic acid was neutralized with potassium carbonate, and the obtained mixture was loaded in a 3 l reactor with a cooling jacket and stirrer. 800 g of solvent having 98.5% titre and with a water content lower than 200 ppm, the crosslinking agent (triallyl pentaerythritol) and the initiator (di(cetyl)peroxydi-carbonate) were added. The mixture was bubbled with a nitrogen flux for 30 minutes, then heated to 55° C. for about 8 hours. The reactor content was dried for 8 hours in a rotary vacuum equipment operating at 80° C.

Table 1 below shows the operating conditions and the properties of the polymers obtained, wherein AA indicates acrylic acid, APE indicates triallylpentaery-thritol and DCP indicates dicetylperoxydicarbonate.

TABLE 1

| Test n. | AA (g) | $K_2CO_3$ moles % | Solvent (g) | APE (g) | DCP (g) | Viscosity sol. 0.5% (CpS) | Solvent Residue (ppm) | Monomer Residue (ppm) |
|---|---|---|---|---|---|---|---|---|
| 1 | 145 | 2.16 | 800 | 2 | 1.45 | 14,000 | 8,800 | 1,200 |
| 2 | 95 | 2.2 | 800 | 1.5 | 0.95 | 12,800 | 8,200 | 600 |
| 3 | 145 | 2.16 | 800 | 2 | 1.45 | 38,000 | 1,300 | 600 |
| 4 | 95 | 2.2 | 800 | 1.5 | 0.95 | 36,500 | 1,450 | 500 |

The polymers resulting from tests 1 and 2 contain more than 8,000 ppm (0.8% by weight) of solvent residue, and the 0.5% weight solutions, neutralized with a 10% NaOH solution, show a viscosity under 15,000 CpS. The polymers resulting from tests 3 and 4 contain less than of 1,500 ppm (0.15% weight) of solvent residue, and 0.5% weight solutions, neutralized with a 10% NaOH solution, show a viscosity higher than 35,000 CpS.

EXAMPLES 5 and 6

The following examples demonstrate that the properties claimed in the present invention are due to the use of ethyl formate independently of the operating conditions. Thus, the comparison test described in example 5 reproduces exactly the conditions described in example 4 of U.S. Pat. No. 4,758,641, and present example 6 instead discloses the use of ethyl formate as solvent, according to the present invention. In both examples, acrylic acid was neutralized with potassium carbonate, and the obtained mixture was loaded in a 3 l reactor with a cooling jacket and stirrer. 705 g of solvent having 99.5% titre and a water content lower than 200 ppm, the crosslinking agent (triallyl pentaeryithritol) and the initiator di(2-ethylhexyl)peroxydicarbonate were added. The mixture was bubbled with a nitrogen flux for 30 minutes, then heated to 50° C. for about 7 hours. The content of the reactor was dried for 12 hours in a rotary vacuum equipment operating at 80° C.

Table 2 below shows the operating conditions and the properties of the obtained polymers, wherein AA indicates acrylic acid, APE indicates triallyl pentaerythritol and DEEP indicates di(2-ethylhexyl)peroxydicarbonate.

TABLE 2

| Test n. | AA (g) | $K_2CO_3$ moles % | Solvent (g) | APE (g) | DEEP (g) | Viscosity sol. 0.5% (CpS) | Viscosity sol. 1% (CpS) | Solvent Residue (ppm) | Monomer Residue (ppm) |
|---|---|---|---|---|---|---|---|---|---|
| 5 | 96.14 | 2.91 | 705 | 1.1 | 0.48 | 32,000 | 48,000 | 8,500 | 600 |
| 6 | 96.14 | 2.91 | 705 | 1.1 | 0.48 | 36,500 | 66,000 | 1,450 | 500 |

According to the present invention, the polymer obtained in test n. 6 shows a higher viscosity for its neutralized solution both at 0.5% and at 1% concentration in water and a lower content of solvent residue with respect to the polymer obtained in comparison test n. 5.

The present invention is applicable to the industrial production of homopolymers and copolymers of acrylic acids and their derivatives. Said homopolymers and copolymers are useful as thickening and suspending agents in, particular in, cosmetic and pharmaceutical, textile, paper, inks and varnishes industries.

We claim:

1. A process for the preparation of crosslinked homopolymers or copolymers of unsaturated carboxylic acids monomers of the formula

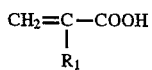

wherein
$R_1$ is hydrogen or methyl,
comprising polymerizing the monomers in a polymerization mixture with a solvent consisting of ethyl formate at a temperature ranging from 40° to 80° C., wherein the monomers constitutes up to 30% by weight of the polymerization mixture.

2. A process according to claim 1, wherein the temperature ranges from 40° to 60° C.

3. A process according to claim 1, wherein the polymerization takes place in the presence of a radicalic initiator.

4. A process according to claim 3, wherein the radicalic initiator is selected from the group consisting of di(2-ethylhexyl)peroxydicarbonate, di(sec-butyl) peroxydicarbonate, di(cyclohexyl)peroxydicarbonate, di(isopropyl)peroXydicarbonate, di(cetyl) peroxydicarbonate, di(t-butyl) peroxydicarbonate, di(n-propyl)-peroxydicarbonate, and di(t-butylcyclohexyl) peroxydicarbonate.

5. A process according to claim 1, wherein the reaction is carried out in a closed reactor with inert atmosphere and with autogenous or artificially induced pressure, or in an open reactor at atmospheric pressure with solvent reflux.

6. A process according to claim 1, wherein the monomers contains up to 5% by weight of vinylidene polyfunctional monomers containing at least two $CH_2=CH-$ groups as crosslinking agents.

7. A process according to claim 6, wherein the crosslinking monomer are selected in the group consisting of polyalkenyl polyethers having more than one alkenyl group per molecule.

8. A process according to claim 7, wherein the crosslinking monomer are selected from the group consisting of polyallyl pentaeryithritol, polyallyl saccharose, trimethylol propane diallylether, diallylethers of polyether diols with molecular weight between 50 and 1,000.

9. A process according to claim 1, wherein less than 3% by weight of the carboxylic groups of the monomers are in form of salt.

10. A process according to claim 9, wherein the salts are selected from the group consisting of alkali or alkaline-earth metal salts, ammonium or alkylammonium salts.

11. A homopolymer or a copolymer of unsaturated carboxylic acids monomers of formula

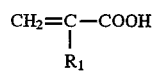

wherein
$R_1$ is hydrogen or methyl,
containing a residue of the monomers which monomer residue is lower than 0.1% by weight and containing a residue of solvent consisting of ethyl formate and which solvent residue is lower than 0.15% by weight.

12. A homopolymer or a copolymer according to claim 11 crosslinked with polyfunctional vinylidene monomers containing at least two $CH_2=CH-$ groups.

13. A homopolymer or a copolymer according to claim 11, containing the crosslinking monomer or monomers selected from the group consisting of polyalkenyl polyethers having more than one alkenyl group per molecule.

14. A homopolyer or a copolymer according to claim 11, containing crosslinking monomer or monomers selected from the group .consisting of polyallyl pentaerythritol, polyallyl saccharose, trimethylol propane diallylether, and diallylethers of polyether diols with molecular weight between 50 and 1,000.

15. A homopolymer or a copolymer according to claim 11, wherein less than 3% by weight of the carboxylic groups of the monomeric mixture is in a form of salt.

16. A homoolymer or a copolymer according to claim 15, wherein the salts are selected from the group consisting of alkali or alkaline-earth metal salts, ammonium or alkylammonium salts.

17. A method for thickening an aqueous composition which comprises the addition of a suitable amount of a homopolymer or copolymer of claim 11 as thickening agent.

18. A homopolymer or a copolymer according to claim 11, wherein a 0.5% weight solution of the homopolymer or copolymer in water, neutralized with 10% NaOH solution, has a viscosity greater than 35,000 Cps.

* * * * *